United States Patent [19]

Hattori et al.

[11] Patent Number: 4,955,082
[45] Date of Patent: Sep. 4, 1990

[54] MOBILE COMMUNICATION SYSTEM

[75] Inventors: Seiji Hattori; Akihide Kasukawa, both of Tokyo; Yoshizo Shibano, Osaka; Yoshinobu Kobayashi, Osaka; Shinji Suzuki, Osaka, all of Japan

[73] Assignees: The Tokyo Electric Power Company Ltd., Tokyo; Sumitomo Electric Industries, Ltd., Osaka, both of Japan

[21] Appl. No.: 295,764

[22] Filed: Jan. 11, 1989

[30] Foreign Application Priority Data

Jan. 14, 1988 [JP] Japan .................................. 63-6555

[51] Int. Cl.⁵ ........................... H04Q 7/00; H04J 3/16
[52] U.S. Cl. ........................................ 455/33; 455/54; 370/95.1; 379/60; 379/63
[58] Field of Search ...................... 455/33, 34, 56, 58, 455/54, 38, 68; 370/18, 82, 95, 105, 95.1, 105.1, 105.2; 379/57, 58, 59, 60, 63

[56] References Cited

U.S. PATENT DOCUMENTS

4,765,753 8/1988 Schmidt ................................ 379/60
4,799,252 1/1989 Eizenhoffer et al. ................. 455/33

Primary Examiner—Reinhard J. Eisenzopf
Assistant Examiner—Curtis Kuntz
Attorney, Agent, or Firm—Cushman, Darby & Cushman

[57] ABSTRACT

A mobile station receives radio waves from all signposts through the positioning channels while making communications using the voice channels. The signal levels of the radio waves thus received are subjected to comparison, so that a zone switching request is made to a signpost with the highest signal level, whereby a mobile station can make communication through that signpost which covers the zone where the mobile station is located, even while traveling. The positioning channels are so set that the frequencies assigned to the signposts are switched every frame in a time series mode, and none of the signposts transmit one and the same frequency at the same time. Therefore, the mobile station can receive radio waves from all the signposts without signal interference (which may be caused when a plurality of stations transmit signals equal in frequency). In the system of the invention, the transmission zones of adjacent signposts overlap each other. When a zone switching request is made, a mobile station can therefore make communications with both of the signposts; that is, the switching of zones can be positively achieved.

1 Claim, 10 Drawing Sheets

MOBILE COMMUNICATION SYSTEM

BACKGROUND OF THE INVENTION

1. Technical Field

This invention relates generally to a mobile communication system wherein communications are enabled with a mobile station through signposts, and more particularly to a novel TDMA (time division multiple access) mobile communication system in which a plurality of signposts are installed in a predetermined area to relay communication to or from a mobile unit, and the signposts thus installed are connected to each other through a transmission network, which is connected to a fixed network.

2. Description of the Prior Art

A mobile communication system is well known in the art in which a plurality of mobile radio base stations are installed in a predetermined area, and while a mobile station is traveling in a area where a mobile radio base station can communicate with such mobile station (a area hereinafter referred to as "a zone", when applicable), communications are carried out between the mobile radio base station and the mobile station. One example of a mobile communications system is an automobile telephone communication system.

In a conventional automobile telephone communication system, the switching of zones during communication is typically carried out as follows: mobile radio base stations receive radio waves from the mobile station and detect the levels of the signals received, which are sent to a mobile control station; the mobile radio base station whose received signal strength is maximum is then selected.

This will be described in more detail. A mobile radio base station monitors the received signal level of a radio wave transmitted by the mobile station, and, when the signal level goes lower than a predetermined value, transmits a level deterioration signal to a mobile control station. Upon reception of the level deterioration signal, the mobile control station requests the remaining mobile radio base stations around the mobile radio base station in question to monitor the signal levels of that station, and receives monitored signal level data from those mobile radio base stations. In the mobile control station, the monitored level data are compared, so that the mobile radio base station maximum in signal level is newly selected. After a circuit is set up between the mobile radio base station thus newly selected and the automobile switching center, the previous mobile radio base station is instructed to disconnect its channel.

PROBLEMS TO BE SOLVED BY THE INVENTION

In the above-described conventional system, the switching of zones is carried out by the mobile radio base stations and the mobile control station, which are facilities on the side of the network. If this system is applied to the mobile communication system in which communications are made with mobile stations through signposts, the following problems are created:

In the mobile communication systems using signposts, the number of signposts in a predetermined area is more than that of signposts in the above-described conventional automobile telephone communication system. Hence, the zone per signpost is typically smaller in area, and accordingly the number of total zones is many. As a result, control operations for detecting the position of a mobile station or for switching the transmission zones are considerably more complex, thus taking a relatively longer time to accomplish.

In view of the foregoing, an object of this invention is to provide a simple mobile communication system of the TDMA type wherein time slots (channels) are effectively utilized to switch zones during communication between a signpost and a mobile unit.

MEANS FOR SOLVING THE PROBLEM

The foregoing object of the invention is achieved by the provision of a mobile communication system, wherein, according to the invention, each of said signposts includes a communicating zone which overlaps the communicating zones of adjacent signposts; a frame of a signal transmitted from a signpost to the mobile station comprises a controlling channel, voice channels, and a positioning channel; the controlling channel and voice channels being set with an assigned frequency particular to the signpost, the positioning channel being so set that the frequencies assigned to the signposts are switched every frame in a time series mode, and none of the signposts transmit one and the same frequency at the same time, while the mobile station receives the levels of the positioning channels, to detect the present position thereof, and to perform a zone switching operation for the communicating zone, the positioning channel from which is maximum in level.

SUMMARY OF THE INVENTION

With the mobile communication system of the invention, a mobile station receives radio waves from all signposts through the positioning channels while making continuous communications using the voice channels. The signal levels of the radio waves thus received are subjected to comparison, so that a zone switching request is made to a signpost which has the highest signal level, whereby a mobile station can communicate with that signpost which covers the zone where the mobile station is located, even while traveling.

The positioning channels are so set that the frequencies assigned to the signposts are switched every frame in a sequence, and none of the signposts transmit one and the same frequency at the same time. Therefore, the mobile station can receive radio waves from all the signposts without signal interference (which may be caused when a plurality of stations transmit signals equal in frequency).

In the system of the invention, the communicating zones of adjacent signposts overlap each other. When a zone switching request is made, therefore, a mobile station can make communications with both of the signposts; that is, the switching of zones can be positively achieved.

DETAILED DESCRIPTION OF THE PREFERRED EMBODIMENT

One preferred embodiment of this invention will be described with reference to the accompanying drawings.

Figure 1:
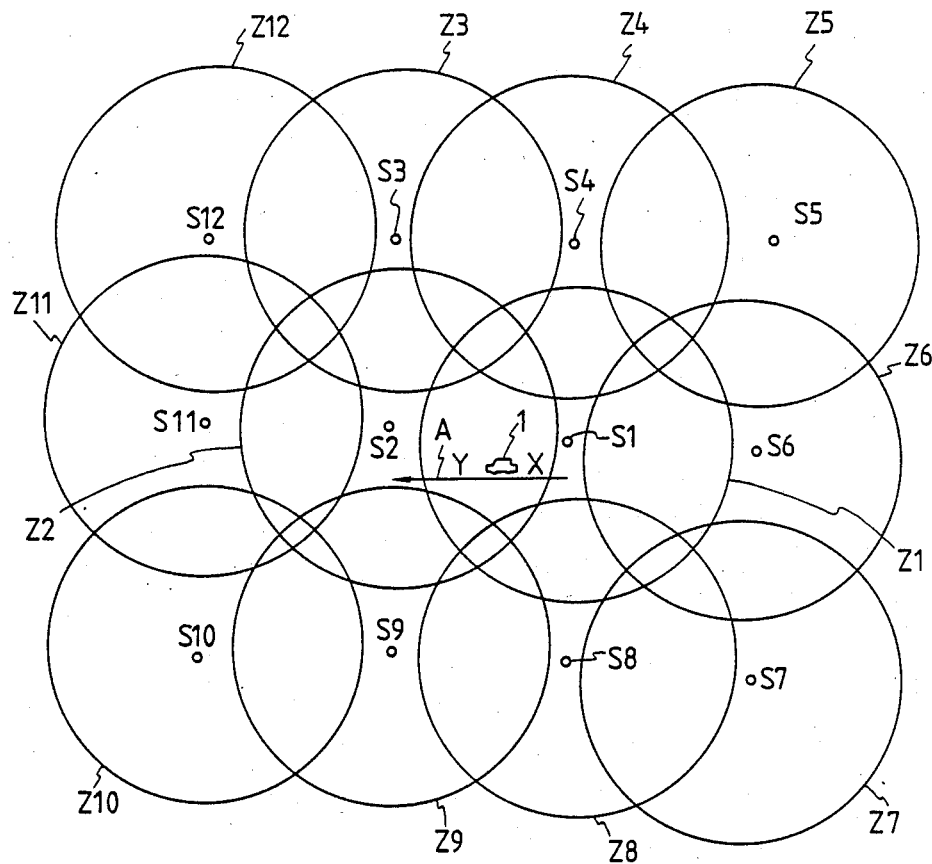
FIG. 1 is an explanatory diagram outlining the arrangement of signposts in a mobile communication system according to this invention.

FIG. 1 is an explanatory diagram outlining the arrangement of signposts S1, S2, ... and Sn. The signposts have communicating zones Z1, Z2, ... Zn, respectively, each of which has a predetermined area large enough to enable communications with mobile stations. The signposts are so arranged that the transmission zones of adjacent signposts overlap one another. In the case of FIG. 1, communication is made through the signpost S1 with a mobile station 1 which is traveling in the direction of the arrow A. Signposts S1 through Sn are connected to one another by a transmission network (not shown) which is connected to a fixed network, such as a public switched telephone network. Therefore, the user of the mobile station 1 can communicate with a subscriber of the public switched telephone network through the mobile communication network.

Transmission between the mobile station 1 and signposts S1 through Sn are carried out according to a TDMA mobile radio communication system. Frequencies f1, f2, f3, ... and fn are provided for the transmission downlink of each of the sign posts S1, S2, S3, ... and Sn, (the term "down" as used herein is intended to mean the communication from a signpost to a mobile station).

Figure 2:
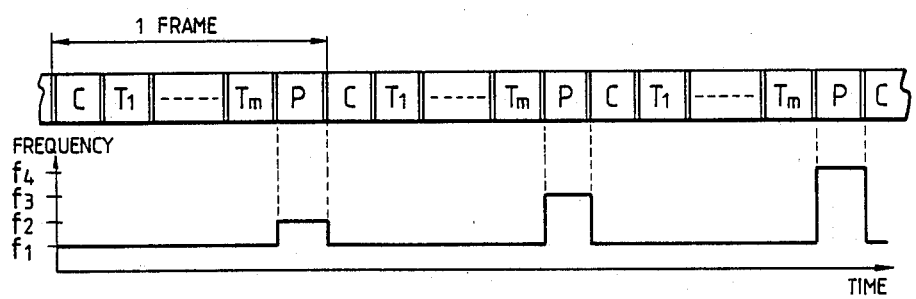
FIG. 2 is an explanatory diagram showing the frame format in a radio wave transmitted by each of the signposts.

FIG. 2 shows the frame format of TDMA signals transmitted by signposts S1 through Sn. At the top of each of the frames, there is provided a control channel C for paging and zone switching. The control channel C is followed by voice channels T1, T2, ... and Tn (the number (m) of the voice channels being designed, for instance, by transmission traffic). At the end of the frame, there is provided a positioning channel P (hereinafter referred to merely as "a channel P", when applicable) for transmitting control data such as the ID number and the empty time slot numbers of the signpost. With the channels P, the different frequencies f1, f2, ... and fn are provided for different frames transmitted successively.

In this way, frame synchronization is established between the mobile station 1 and all the signposts S1 through Sn. Hereinafter, any one of the signposts (except when a particular one or ones of the sign posts are specified) will be referred to as a signposts S, and similarly any one of the communicating zones (except when a particular one or ones of the communicating zones are specified) will be referred to as "a communicating zone Z".

The frequency assignment of the channel P will be described with reference to a signpost Si in detail. In each frame of the signal (down-link) transmitted by the signpost Si, for the control channel C up to the transmission channel Tm, transmission is carried out with a carrier frequency fi; but the channels P in different frames make transmissions with different frequencies. A series of frames successively transmitted by the signpost Si will be referred to as "first, second, ... and n-th frames", for convenience in description.

In this case, with the first frame, transmission is made with a frequency fi; with the second frame, transmission is made with a frequency fi+1, and so on. And, with the n-th frame, transmission is made with a frequency fi−1. This operation is repeatedly carried out. The assignment of frequencies to the channels P of the sign posts S is indicated, for instance, by the following Table 1:

TABLE 1

|    | 1  | 2    | 3    | — | n    |
|----|----|------|------|---|------|
| S1 | f1 | f2   | f3   | — | fn   |
| S2 | f2 | f3   | f4   | — | f1   |
| S3 | f3 | f4   | f5   | — | f2   |
| —  |    |      |      |   |      |
| Si | fi | fi+1 | fi+2 | — | fi−1 |
| —  |    |      |      |   |      |
| Sn | fn | f1   | f2   | — | fn−1 |

In Table 1, numerals 1, 2, ... and n in the top horizontal line designate the frame numbers, and S1, S2, ... and Sn in the leftmost column the signpost numbers.

As is apparent from Table 1, different signposts use different frequencies at any one moment in time, which eliminates the frequency interference often attributed to the use of the same frequency. That is, in the frequency assignment zone consisting of n signposts, the different channels P use different frequencies.

Detection of a zone in which the mobile station 1 is located (hereinafter referred to as "an in-zone", when applicable) is carried out when the power switch of the mobile station 1 is turned on, or when it goes into the zone. That is, during the initial period, it is impossible for the mobile station to determine a frequency to be received. In the mobile station, receiving frequencies must be searched by switching the frequency of the frequency synthesizer so that several frequencies which are high in reception level to the extent that the demodulation thereof can be effected. The IDs transmitted by the channels P corresponding to these frequencies, and their reception levels are monitored, and the in-zone (Zi) is determined from the ID providing the maximum signal reception level. When the in-zone Zi has been determined as described above, with the communicating frequency of the mobile station 1 switched over to that frequency according to the data on the frequency (fi) assigned to the sign post (Si) transmitted through the channel P, the mobile station becomes ready to call or to be called.

Figure 3:
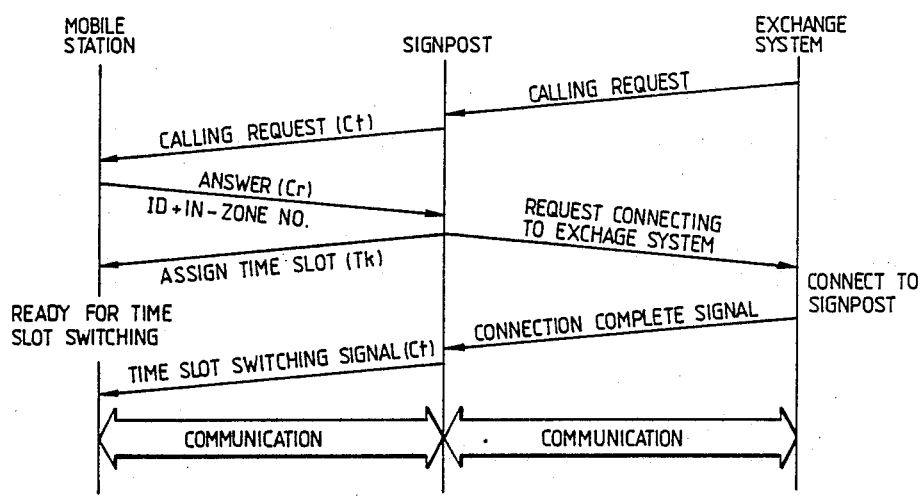
FIG. 3 is an explanatory diagram showing a procedure of call terminating.

FIG. 3 shows a procedure of a call terminating. A calling request from an exchange system is made in the form of a paging by the signposts using controlling time slots Ct (the suffix "t" meaning "down"). Upon reception of the calling request, the mobile station 1 answers using a control time slot Cr (the suffix character "r" meaning "up"). In this operation, the ID of the mobile station is also transmitted. In addition to the ID, the in-zone number i may be transmitted so that the answer is received with higher reliability.

Upon reception of the answer, the signpost Si specifies only the assignment of a voice time slot Tk, and requests the exchange system to perform a link connection. Upon completion of the link connection, the exchange system instructs the mobile station 1 to switch the time slot over to the voice time slot Tk. Thus, the communicating is carried out through the voice time slot Tk.

Figure 4:
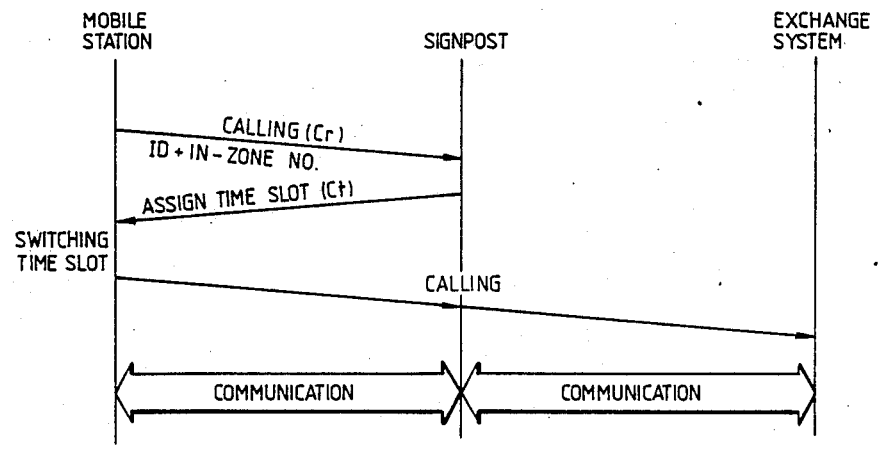
FIG. 4 is an explanatory diagram showing a procedure of call originating.

FIG. 4 shows a procedure of originating a call. The mobile station 1 uses the controlling time slot Cr for calling. In this operation, the mobile station 1 also transmits its ID. In this case, in addition to the ID, the in-zone number i may be transmitted so that the calling request can be highly reliable. Upon reception of the calling signal, the signpost Si specifies the assignment of the voice time slot Tk using the controlling time slot Ct. In response to this, the switching operation concerned is carried out for a voice channel, so that the mobile station 1 is connected to the switching system.

A procedure of switching zones during communications in the above-described mobile communications will be briefly described.

(1) The mobile station 1 in the communicating zone Z1 of the signpost Si, while making communication by using the voice channel T, successively receives the frequencies f1, f2, f3, ... and fn through the channels P of the frames, thereby to receive all the radio waves from the signposts S, whereby the signpost numbers included in the channels P are identified and stored in memory in the mobile station 1.

At least one of the signposts S transmits the signpost number using the frequency fi with the channel p (cf. Table 1). After n frames being received, the signal reception level of the radio waves from all the signpost S1, S2, ... and Sn therefore can be detected, and consequently can be stored in memory in the mobile station (in addition, the inherent frequency data assigned to the signpost Si is detected).

The signal reception levels of the radio waves from all the signposts S1, S2, ... and Sn are subjected to comparison, so that the signpost Sj highest in signal reception level is selected, and a transmission switching request is made to the signpost Si by using the control channel C.

The signpost Si requests the switching system to change the connection of the line, thereby to make a request through the switching system to the signpost Sj highest in signal reception level for a voice channel.

Upon reception of the request, the signpost Sj rewrites its channel assignment table according to the ID number of the mobile station 1, and specifying a voice channel T, instructs the mobile station to change the voice channel which the mobile station uses with the present signpost Si.

In the signpost Si, the old voice channel is cancelled, and the connection to the network is eliminated.

Figure 5:
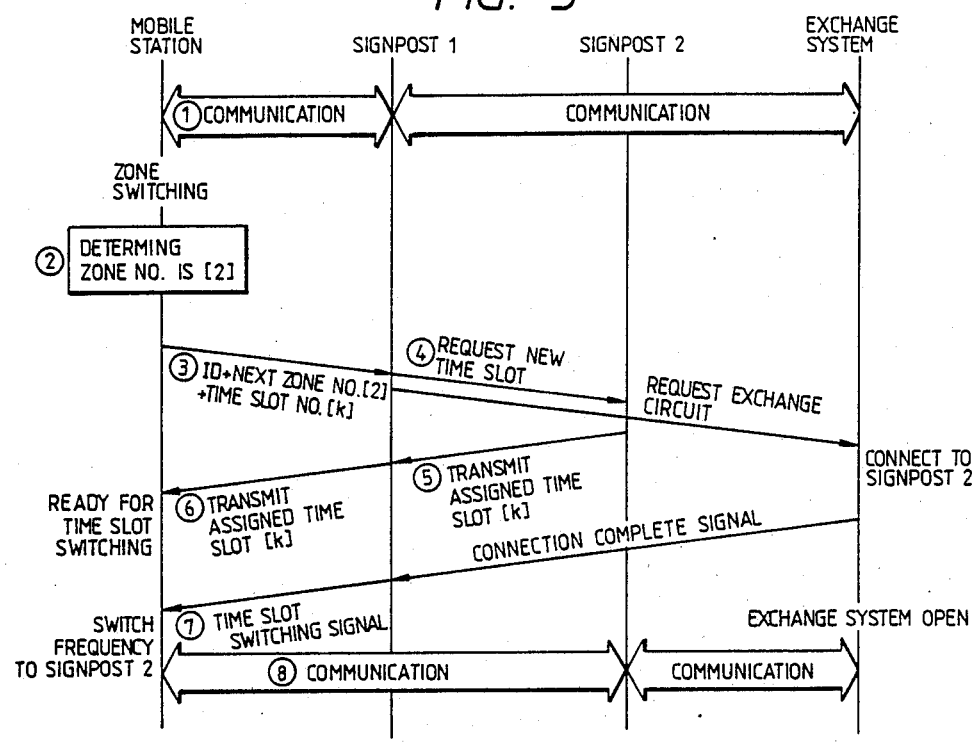
FIG. 5 is an explanatory diagram showing a zone switching procedure during communication.

The above-described zone switching procedure during communication will now be described with reference to FIGS. 1 and 5 in more detail.

It is assumed that the mobile station 1 is located at the central portion X of the communicating zone Z1. The mobile station 1 communicates with the signpost S1 using the time slot Tj, assigned to the mobile station, of the inherent frequencies ft1 and fr1 (t representing "transmitting", and r "receiving") which are assigned to the signpost S1. At the same time, the mobile station 1 detects the IDs of the signposts S and their signal reception levels. The IDs are transmitted successively from the different signposts S with the different frames by using the channels P. As a result, the mobiles station recognizes that the transmission zone is Z1 (of the signpost S1 in this case) providing the ID highest in level is his in-zone number 1.

When the mobile station 1 comes to the edge Y of the communicating zone Z1, the channel P transmitted by the signpost S2 has the highest signal reception level, as a result of which the mobile station will detect that it has traveled into the next communicating zone (Z2), and that the destination zone number is "2".

In addition, according to the empty time slot number data transmitted at the same time, the empty time slot numbers of the next zone can be detected.

In order to request the voice time slots of the inherent frequencies ft2 and fr2 of the signpost S2 assigned to the communicating zone Z2, the mobile station 1 transmits the following to the signpost S1 by using the controlling channel Cr:

1—The ID of the mobile station,
2—The ID of the next zone,
3—The number k of the time slot to be used in the next zone.

The signpost S1 makes a request through the network to the signpost S2 for assignment of a voice time slot Tk to the mobile station 1, and requests the switching system to switch the connection from the signpost S1 over to the signpost S2.

The signpost S2 reserves the voice time slot Tk. For the purpose of confirmation, the signpost S2 may transmit the time slot number k.

In addition, for the purpose of confirmation of the reservation, the signpost S1 may transmit the time slot number k to the mobile station 1 by using the controlling channel Ct.

Upon completion of the switching of the connection, the signpost S1 uses the controlling channel Ct to instruct the mobile station to switch the frequencies over to the frequencies ft2 and fr2 of the signpost S2. Thereafter, the voice time slot with the mobile station 1 is released.

In response to the instruction from the signpost S1, the mobile station 1 switches the frequencies over to the frequencies ft2 and fr2 of the signpost S2, so that the communication is continued by using the voice time slot Tk.

Thus, the period of time that the communication is potentially disrupted is minimized.

As is apparent from the above description, in order that the mobile station 1 is kept in the first communicating zone Z1 for the period of time which elapses from the time instant its entry to that, after the mobile station 1 comes into the second communication zone Z2, wherein the level of the radio wave of the down-link of the second communication zone Z2 correspondingly becomes higher than that of the radio wave of the first communication zone Z1 until the switching of communication zones is accomplished, it is essential to overlap the zones Z.

Figure 6:
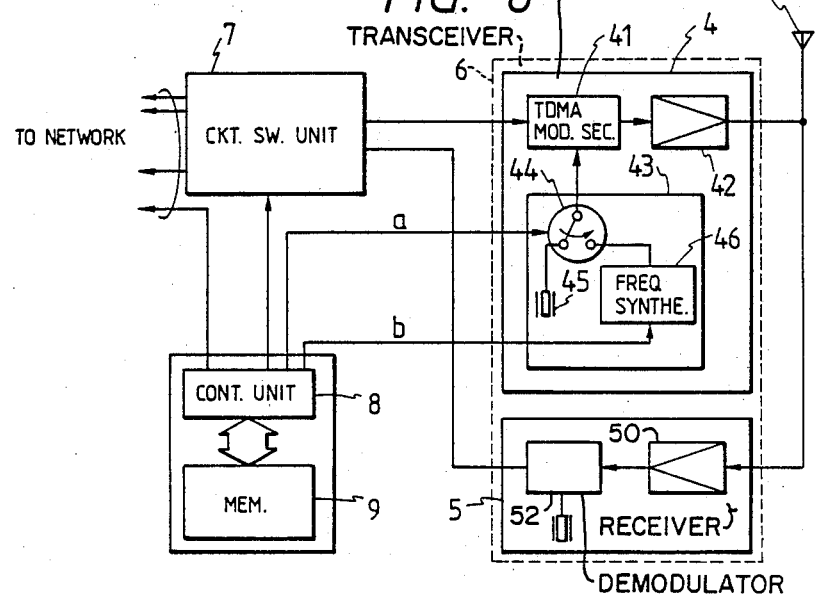
FIG. 6 is a block diagram showing one example of the circuitry of the signpost in the system of the invention.

FIG. 6 is block diagram showing the arrangement of each of the signposts in the mobile communication system according to the present invention. The signpost S, as shown in FIG. 6, comprises: an antenna 3; a voice channel transceiver 6 (which operates as a transmitter (4) and a receiver (5)); a circuit switching unit 7 interposed between the transceiver 6 and a network; a memory unit for storing, for instance, the control table of wireless channels and mobile station IDs; and a control unit 8. The transceivers 6 described above are provided for as many as the channels as are required, and are connected selectively to the predetermined channel circuits and networks through the circuit switching unit 7. The assignment of the channels (corresponding to the time slots) to the mobile station 1 and the connection thereof are accomplished as functions of the signpost S, and realized according to a "wire and wireless channel assignment control table" stored in the memory unit 9.

The transmitter 4, as shown in FIG. 6, includes: a TDMA modulator section 41; an amplifier section 42; and a frequency switching unit 43 for changing frequencies according to time slots.

The receiver 5, as shown in FIG. 6, includes an input amplifier 50, a fixed oscillator 51, and a demodulator 52.

Figure 7:
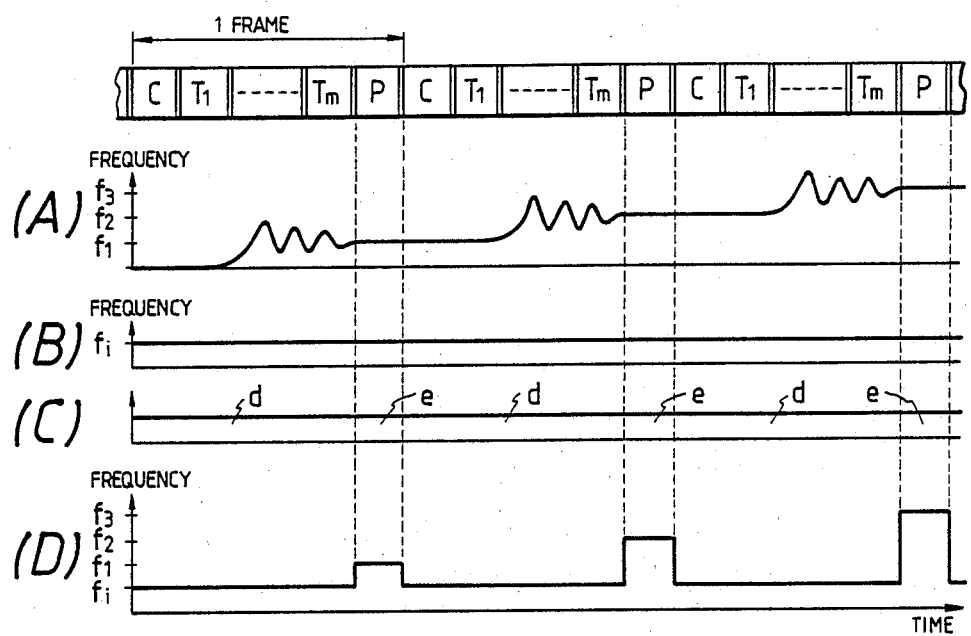
FIG. 7 is an explanatory diagram for a description of the operation of the signpost shown in FIG. 6.

The frequency switching unit 43 will be described in more detail. The frequency switching unit 43 comprises: a changeover switch 44; a fixed oscillator 45 for generating a frequency fi inherent to the signpost S (cf. FIG. 7, (A)); and a frequency synthesizer 46 for generating the frequencies (cf. FIG. 7, (B)) of adjacent signpost. The frequency synthesizer 46 successively switches the frequencies of the adjacent signposts according to a frequency switching signal b provided by the control unit 8, and with the timing d and e (cf. FIG. 7, (C)) of a switch operating instruction signal a provided by the control unit 8 the change-over switch 44 switches the frequency fi inherent to the signpost S and the frequencies of the adjacent signposts, as a result of which a signal framed as shown in the part (D) of FIG. 7 is formed. The switching of frequencies by the frequency synthesizer 46 is achieved with the following time Tc:

Tc=(one frame duration)−(one time slot duration), therefore, the switching of frequencies is readily and quickly achieved.

Figure 8:
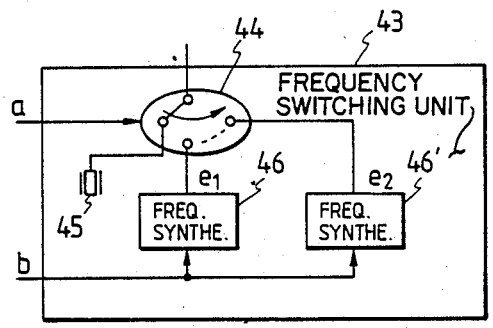
FIG. 8 is a block diagram showing a frequency switching unit with a plurality of frequency synthesizers.
Figure 9:
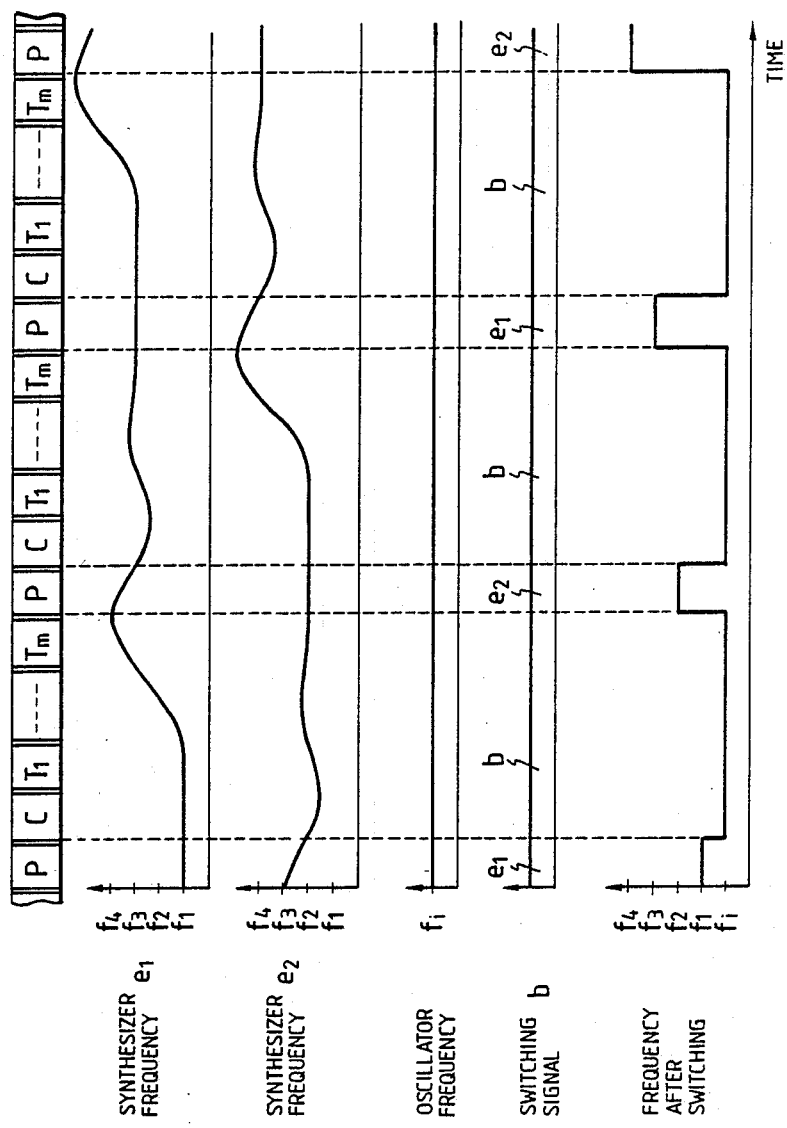
FIG. 9 is an explanatory diagram for a description of the operation of the frequency switching unit shown in FIG. 8.

If the frequency switching speed of the frequency synthesizer is such that the switching of frequencies cannot be achieved with the time Tc described above, another frequency synthesizer 46' is added as shown in FIG. 8. In this case, the outputs of the frequency synthesizers are successively switched to achieve the switching of frequencies at high speed. One example of the operation of the frequency switching unit shown in FIG. 8 is as shown in FIG. 9. As is apparent from FIG. 9, the switching of frequencies by the frequency synthesizers is accomplished within the time defined as follows:

2×(one frame duration)−(one time slot duration), therefore, the switching of frequencies is achieved more readily.

Figure 10:
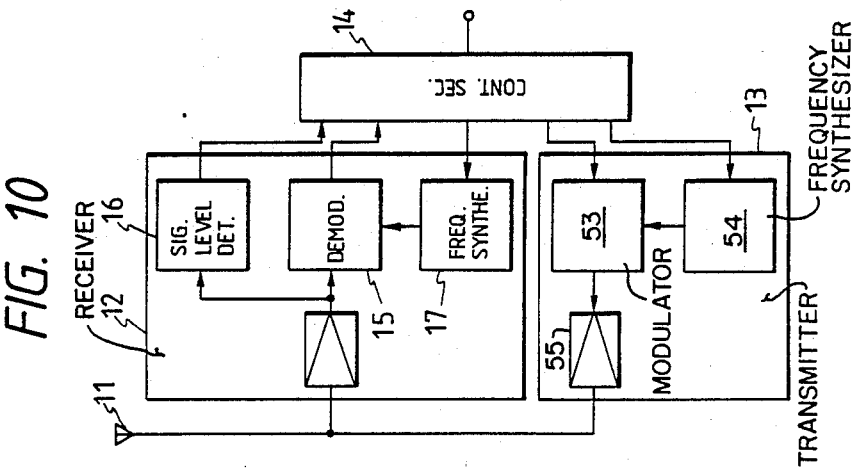
FIG. 10 is a block diagram showing one example of the circuitry of the mobile station.

FIG. 10 is a block diagram showing the arrangement of a typical mobile station according to the present invention. A mobile station, as shown in FIG. 10, includes; a signal transmitting and receiving antenna 11; a receiver section 12; a transmitter section 13; and a control section 14 for controlling the receiver section 12 and the transmitter section 13. The receiver section 12 is made up of a demodulator 15, a received signal level detector 16, and a frequency synthesizer 17. The control section 14 is to convert demodulated signals into audio signals, or to convert audio signals into modulated signals, and to switch signal receiving and transmitting frequencies.

The transmitter section 13, as shown in FIG. 10, includes a modulator 53, a frequency synthesizer 54, and an output amplifier 55.

Figure 11:
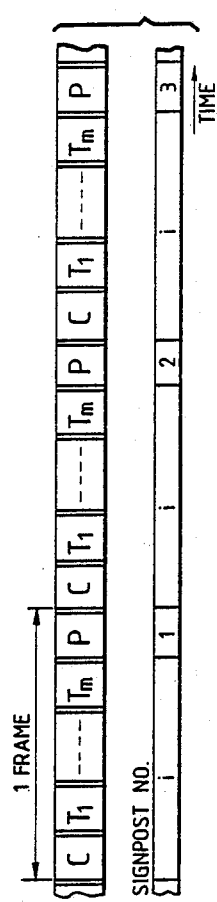
FIG. 11 is an explanatory diagram showing the frame format of a signal received by the mobile station.

FIG. 11 shows the frame format of the signal received by the mobile station. It is disposed such that a frame consisting of a control channel C, voice channels T1, T2, ... and Tm, and a channel P occurs repeatedly.

When the signpost Si transmits signals (cf. FIG. 2), with respect to the control channel C and the voice channels T1 through Tm, the mobile station therefore receives the radio wave from the signpost Si in the inzone where it is located, and with respect to the channel P, it receives the radio waves from the adjacent sign posts successively every frame. Receiving frames the number of times equal to at least the number of adjacent signposts, the signal reception levels of all the adjacent repeaters is therefore detected.

EXAMPLE

Figure 12:
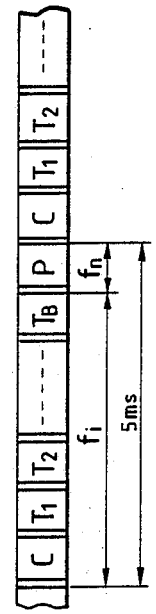
FIG. 12 is an explanatory diagram showing an example of the frame format of a signal transmitted from a signpost.
Figure 13:
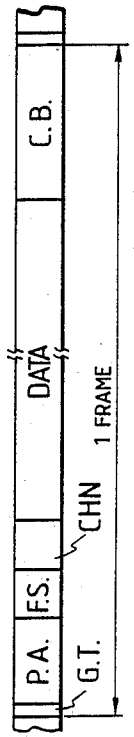
FIG. 13 is an explanatory diagram showing an example of the contents of a typical frame, wherein 1—Mobile station; S1 through Sn—Sign posts; Z1 through Zn—Communicating areas; C—Control channel; T—Voice channel; P—Positioning channel.

FIG. 12 is a diagram showing an example of the arrangement of channels, and FIG. 13 is a diagram showing the content of a frame thereof.

The mobile communication system according to the invention is discussed using the following parameters:

| | |
|---|---|
| Data transmission rate | 32 kbps |
| Number of multiplexing | 8 |
| Contents of the frame: | |
| preamble (PA) | 32 bits |
| frame synchronization pattern (FS) | 8 bits |
| channel number (CNH) | 8 bits |
| data (DATA) | 160 bits |
| error correction bits (CB) | 40 bits |
| guard time (GT) | 2 bits |
| Total: 250 bits (cf. FIG. 13) | |

Under the above-described conditions, the channel P can be monitored 200 times per second. That is, the time tl required for measuring the signal reception levels of w channels P with respect to one sign post is as follows:

$$tl = 0.005 \times w \times 25 = 0.125w (\text{sec})$$

When the speed of the mobile station 1 is 60 km/h (16.7 m/s), the relation between the amount of movement x of the mobile station 1 and the number of times of measurement w is as follows:

$$w = 0.48x$$

For instance when the overlap of adjacent zones is 50 m, then the level measurement can be carried out twenty-four (24) times.

Measuring the signal reception levels repeatedly and processing the results statistically (for instance by averaging), the signal reception level decision becomes more accurate, and accordingly the in-zone is determined with high accuracy.

EFFECTS OF THE INVENTION

As was described above, in the mobile communication system of the invention, it is unnecessary for the mobile station to perform the switching of frequencies for every time slot, or to provide a signal reception level monitoring receiver, and the mobile station can detect the signal reception levels of the radio waves from all the signposts while concurrently enabling communications through the voice channels. Therefore, according to the signal reception levels obtained, the mobile station can identify the zone where it is located, and the link between the signpost and the network can smoothly and quickly switch to the next signpost while communicating with the mobile station.

What is claimed is:

1. A mobile communication system of the TDMA type for use with a mobile station and a mobile station receiver, comprising:

a plurality of fixed signal transmitting and receiving signposts, each said signpost comprising at least one communicating zone, said zone of each said signpost overlapping a communicating zone of an adjacent signpost;

a signal transmitted from said signposts comprising a frame, said frame including at least one controlling channel, a plurality of voice channels, and at least one positioning channel, said controlling channel and said voice channels comprising a predetermined frequency that is assigned to each said signpost; and means for setting said positioning channel such that said predetermined frequencies assigned to said signposts are switched every said frame, whereby, said mobile station receiver monitors each said positioning channel, detects a position of said mobile station based on each said positioning channel, and performs a zone switching operation between adjacent signposts based on the detected position of the mobile station.

* * * * *